March 26, 1963     T. L. ATKINS ETAL     3,082,777
BEVERAGE BOTTLE CLEANING MACHINE Filed April 6, 1961     3 Sheets-Sheet 1

INVENTORS.
THOMAS L. ATKINS
JOE H. ROBERTSON

BY Shanley & O'Neil
ATTORNEYS

March 26, 1963     T. L. ATKINS ETAL     3,082,777
BEVERAGE BOTTLE CLEANING MACHINE Filed April 6, 1961     3 Sheets-Sheet 2

INVENTORS.
THOMAS L. ATKINS
JOE H. ROBERTSON

BY Shanley & O'Neil
ATTORNEYS.

INVENTORS.
THOMAS L. ATKINS
JOE H. ROBERTSON

BY Shanley & O'Neil
ATTORNEYS.

UnitedStates Patent Office 3,082,777
Patented Mar. 26, 1963

3,082,777
BEVERAGE BOTTLE CLEANING MACHINE
Thomas L. Atkins and Joe H. Robertson, both of Claiborne Parish, Homer, La.
Filed Apr. 6, 1961, Ser. No. 101,162
4 Claims. (Cl. 134—158)

The present invention relates to beverage bottle cleaning machines, more particularly of the type in which beverage bottles to be cleaned are placed on a moving carrier by which they are immersed in and moved thrrough a beverage bottle cleaning liquid.

Beverage bottles such as soft drink bottles are ordinarily washed in a washing machine and thus made ready for reuse. A minor proportion of the bottles, however, cannot be cleaned in the ordinary washing operation because they have become fouled with rust, cement, tar or other heavy deposits. In the past, such bottles have often been discarded as uneconomical to clean. But as the cost of beverage bottles has risen sharply in recent years, it is now economical to attempt to reclaim these badly soiled bottles.

Accordingly, it is an object of the present invention to provide a beverage bottle cleaning machine which will reclaim badly soiled bottles.

Another object of the present invention is the provision of a beverage bottle cleaning machine of the liquid bath type, in which those portions of the bottle which tend most often to be fouled with foreign substances are subjected to the greatest flow of liquid.

Still another object of the present invention is the provision of a beverage bottle cleaning machine which can be easily loaded and unloaded and in which the bottles are quite stable and secure during operation of the machine.

Finally, it is an object of the present invention to provide a beverage bottle cleaning machine which will be relatively easy and inexpensive to manufacture, safe and dependable to operate, and rugged and durable in use.

Other objects and advantages of the present invention will become apparent from a consideration of the following description, taken in connection with the accompanying drawings, in which.

Figure 2:
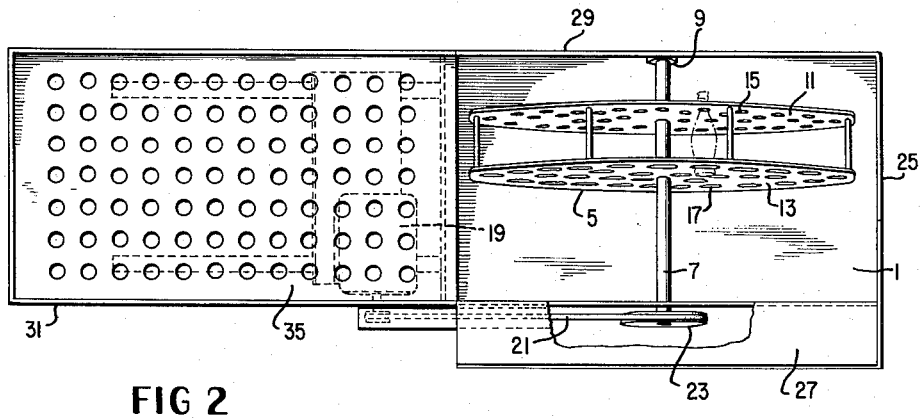
FIGURE 2 is a plan view of the device of FIGURE 1.
Figure 1:
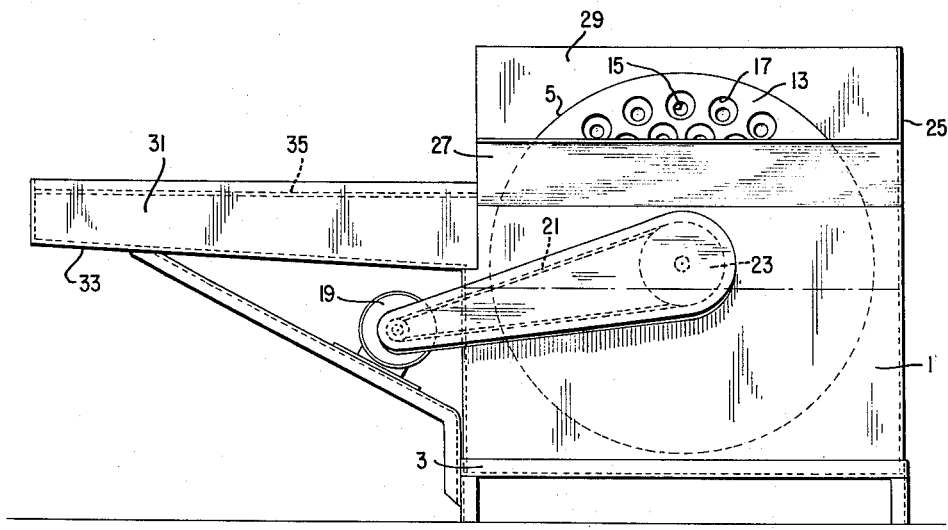
FIGURE 1 is a side elevational view of a beverage bottle cleaning machine according to the present invention.

Referring now to the drawings in greater detail, there is shown a tank indicated at 1 and adapted to receive and retain a quantity of bottle cleaning liquid such as a strong solution of inorganic acid of a viscosity about the same as or not substantially greater than that of water and which may for example take the form of a 10% aqueous solution of "Servac," an acid dairy detergent having 37.0–38.0% acidity as phosphoric acid and manufactured by Wyandotte Chemicals Corporation. Such a solution has a $p^H$ of 1.05 and a viscosity only slightly greater than that of water. Tank 1 stands on legs provided by a supporting frame 3.

Mounted in tank 1 is a rotor 5 carried by an axle 7 for rotation about the axis of axle 7. Rotor 5 is partially immersed in the bath of cleaning liquid, and axle 7 is just a little bit above the level of the cleaning liquid and is carried by bearings 9 in the opposite side walls of tank 1.

Rotor 5 comprises a pair of spaced parallel plates 11 and 13 of which the axes are coincident with the axis of axle 7.

A very important feature of the present invention is that axle 7 is not parallel to the surface of the cleaning liquid. Instead, axle 7 is inclined at a small acute angle of about 4–8° to the horizontal. Thus, plate 11 is the lower of the two plates while plate 13 is the upper or top plate. Plate 11, the lower plate, is provided with a multiplicity of relatively small openings 15 therethrough, while plate 11 is provided with a substantially equal number of relatively large openings 17 therethrough. Openings 15 and 17 are circular, and each of a multiplicity of openings 15 is coaxial with a larger opening 17 on plate 13.

The cleaning machine of the present invention is motor driven for slowly rotating rotor 5 in the bath of cleaning liquid, thereby to assure the application of cleaning liquid to all the bottles. To this end, frame 3 supports an electric drive motor 19 having a driveshaft carrying a relatively small drive pulley which is interconnected by a drive belt 21 with a relatively large pulley 23, which in turn is mounted on the end of axle 7 outside tank 1 and is coaxial with and rotates rotor 5 thereby periodically to immerse and to drain bottles carried by rotor 5. For a rotor of 36" diameter, 3 revolutions per minute are adequate. Of course, any number of speed reduction mechanisms other than belt and differential pulleys may be used, for example reduction gearing.

Tank 1 is provided with a removable end splash shield 25 and removable front and rear splash shields 27 and 29, respectively. Front splash shield 27 is downwardly inwardly inclined toward the bath so as to return to the bath cleaning liquid that drips from the wet bottles as they are removed from the rotor.

The cleaning machine also includes a drain board 31 having an inclined bottom 33 along which cleaning solution returns to tank 1. Drain board 31 also has a multi-perforate rack 35 spaced above bottom 33, for the insertion and draining of bottles neck down.

The operation of the device of the present invention will now be apparent:

The bottles B, which are ordinary soft drink bottles of the type in which carbonated soft drinks are dispensed from coin-operated vending machines or open type coolers, are loaded into rotor 5 in the direction of their necks, that is, the necks of the bottles are first inserted through relatively large openings 17 and then through relatively small openings 15. The relatively small openings 15 prevent the bottles from pitching forward all the way through the rotor.

Plates 11 and 13 of rotor 5 are inclined from the vertical and the circular openings 15 and 17 through those plates also have their axes inclined from the vertical. Therefore, the bottles are held in the rotor with their axes substantially parallel to the axis of the rotor and also inclined from the horizontal at a small acute angle of about 4–8°, with the open end of the bottles down.

Motor 19 is then actuated to rotate axle 7 through drive belt 21 and pulley 23 so as to rotate axle 7 at a relatively low speed, for example about 3 revolutions per minute. As the rotor turns, the bottles are immersed in and passed through and raised up out of the cleaning liquid. At all times, their axes remain inclined at a small angle from the surface of the bath, for the axes of the bottles are parallel to the axis of the rotor and the axis of the rotor remains disposed at a small angle to the surface of the bath.

Figure 7:
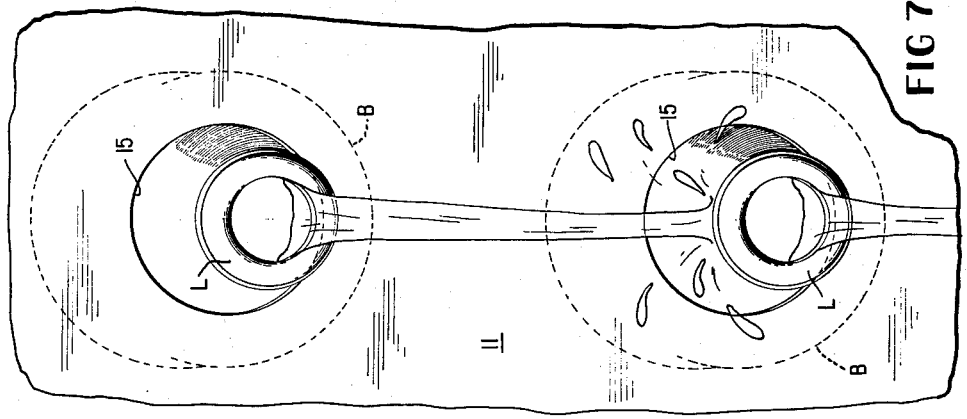
FIGURE 7 is a front view of the structure of FIGURE 5.
Figure 6:
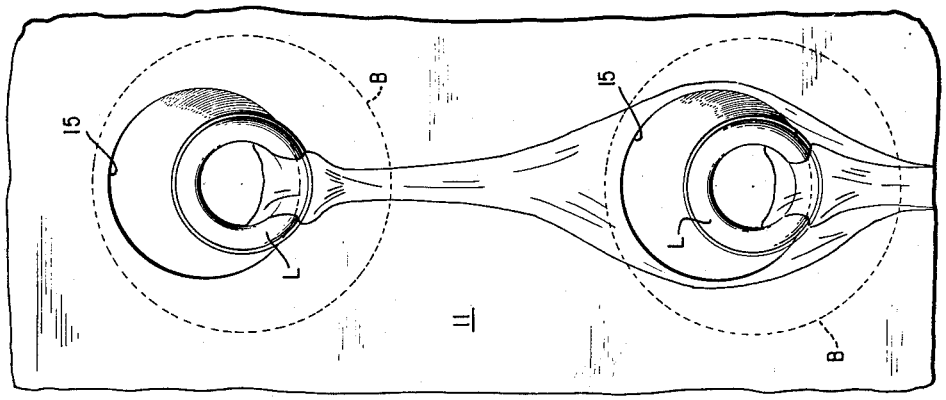
FIGURE 6 is a front view of the structure of FIGURE 4.
Figure 3:
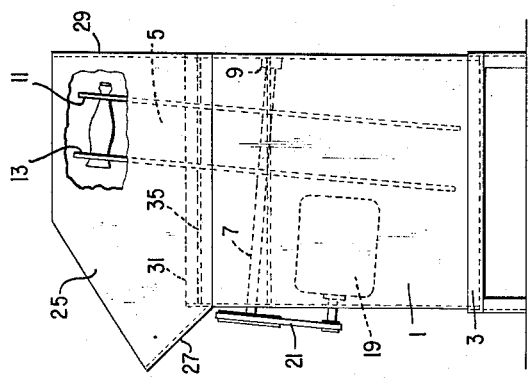
FIGURE 3 is an end elevational view of the device of FIGURE 1.
Figure 5:
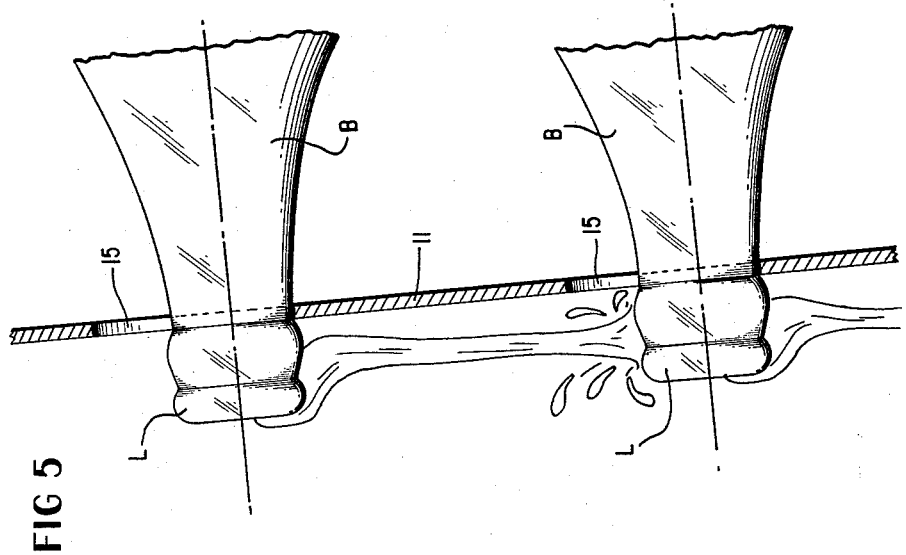
FIGURE 5 is a view similar to FIGURE 4 but showing the bottles arranged as in the present invention.
Figure 4:
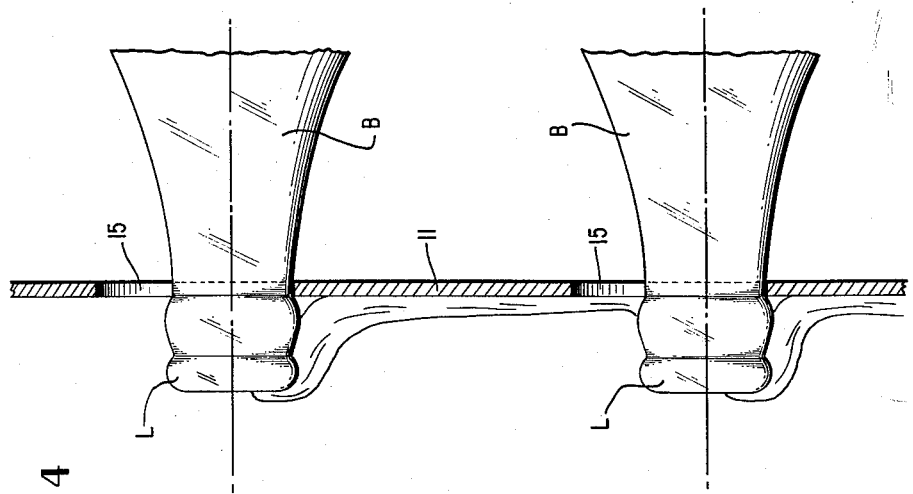
FIGURE 4 is an enlarged fragmentary side view of bottles having their axes horizontal during washing and showing the path of liquid discharged from the necks of the bottles.

When the bottles are in the bath, they become partly filled with cleaning liquid. As they rise from the bath, the liquid drains from the open mouths of the bottles, and a very important feature of the present invention is the manner in which the liquid drains as a result of the inclination of the axis of the rotor. The manner of bottle drainage when the axis of the rotor is inclined as in the present invention is compared to what the drainage would be if the axis were horizontal, in FIGURES 4–7. FIGURES 4 and 6 comprise side and front views of bottle drainage when the axis is horizontal; while FIGURES 5 and 7 present side and front views of bottle drainage when the axis is inclined according to the present invention. Side-by-side comparison of FIGURES 4 and 5, and FIGURES 6 and 7, shows some of the greatly improved results of the present invention. In FIGURES 4 and 6, it will be seen that when the axis is horizontal, the cleaning liquid tends to flow out of the bottles and dribble down the necks of the bottles until it reaches the rotor, where it dribbles down the face of plate 11 of the rotor until it reaches the opening 15 next below. As is well known, a liquid tends to run about the edges of a circular opening in a vertical plate in preference to forming drops and dripping across the diameter of the opening. Accordingly, as seen in FIGURE 6, most of the liquid that dribbles down the face of plate 11 from an upper opening 15 runs in a pair of streams about the next lower opening 15 on opposite sides thereof. The cleaning action of this liquid running down the face of the rotor is lost, as the liquid for the most part does not further contact any bottle neck.

In sharp contrast, however, as seen in FIGURES 5 and 7, the inclination of the axis of the bottles, achieved by inclination of the axis of the rotor, causes cleaning liquid draining from bottles in the present invention to fall from the bottles before it runs back along the neck. Specifically, as seen in FIGURES 5 and 7, the liquid falls from the lip L of the bottle onto the necks and lips of the bottles next below. The liquid draining from the bottles in the present invention, therefore, performs a dual function: it cleans the bottles when the bottles are moving through the bath beneath the surface of the bath, and it falls upon the necks and lips of the bottles while the liquid is draining from the bottles when the bottles are above the surface of the liquid.

The latter result of the present invention is very fortunate indeed, for it applies an extra cleaning action to bottles where it is most needed, namely, adjacent the open mouth of the bottle. The open mouth of the bottle most often needs extra cleaning attention because it is the part of the bottle that tends most often to become severely soiled. For example, when bottle caps are put back on bottles and the bottles are left outdoors, the caps lay down a heavy deposit of rust on the lips of the bottles. Also, when bottles become smeared in tar or cement or grease, it is the protuberances of the lip and the open end of the bottle that most easily scoop up the foreign material.

Of course, the very best angle of inclination of the rotor and bottle axes in any given case will depend on the configuration of the bottles and the viscosity of the cleaning liquid. In general, the more slender the bottle neck the smaller can be the angle of inclination of the axis of the bottle to the horizontal, and the lower the viscosity of the cleaning liquid the greater must be that angle.

The downward inclination of the open ends of the bottles also produces the result that when the bottles are immersed in the cleaning liquid not as much cleaning liquid will run into the bottles. This result, however, is harmless, for it is not at all necessary to fill the bottles with cleaning liquid. A relatively small quantity of liquid in the bottles will clean them. This is because even a small amount of liquid will cover the inside of the bottle all the way to the rear of the bottle, so that when the bottles revolve about the axis of the rotor this relatively small amount of cleaning liquid will move about the interior of the bottle contacting and cleaning all portions of the interior of the bottle. As a result, it makes no practical difference whether that quantity of liquid within the bottle is large or small.

Upon completion of a cleaning cycle of perhaps thirty minutes, the bottles are unloaded from the rotor and placed open end down on drain board 31 with their necks extending through the openings through multi-perforate rack 35 on which they are supported, so that cleaning liquid drains from the bottles and falls on the inclined bottom 33 of the drain board and runs back down into the tank 1. After draining, the bottles are then placed in the usual bottle washing machine where they are washed in the company of bottles which were not badly soiled to begin with and which are receiving only their first liquid cleaning treatment.

In addition to the advantage of the present invention which comprises application of the draining liquid to the necks and lips of the bottles below, another great advantage of the present invention is the ease of loading and unloading the rotor. As the bases of the bottles are higher than the necks of the bottles, the bottle-receiving pockets provided by the rotor are inclined upward to the rear for easy reception of the bottles. An operator standing at a greater height than the rotor can thus more easily load bottles into and remove bottles from the rotor because of this inclination than if the axis of the rotor were horizontal.

Still another great advantage of the present invention resides in the fact that because of the inclination of the axis of the rotor, the bottles are automatically held in the pockets provided by openings 15 and 17 without special means to lock them in against rearward displacement. Gravity keeps them there. This is in sharp contrast to a construction in which the axis of the rotor is horizontal and the axes of the bottles are also horizontal and in which a certain number of bottles would inevitably become dislodged from the rotor during the cleaning cycle and fall into the tank. The construction of the present invention is also in sharp contrast to a construction in which the axis of the rotor is horizontal but the axes of the bottles are inclined to the axis of the rotor as elements of a cone converging in the direction of the open mouths of the bottles. Such a construction might tend to have a desirable draining effect toward the top of the rotor, but toward the bottom of the rotor the bottles would tend to fall out of the rotor into the tank even more than if the axes of the bottles were merely horizontal, for in the lower portion of a rotor the axes of the bottles would be inclined upward in the direction of the necks of the bottles.

From a consideration of the foregoing disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A bottle washing machine comprising a tank for bottle cleaning liquid, a rotor, means mounting the rotor in the tank for rotation about an axis inclined at an angle of about 4–8° to the horizontal, and means for mounting a plurality of bottles on their sides on the rotor with the bottles inclined at an angle of about 4–8° to the horizontal, open end down.

2. A bottle washing machine comprising a tank for bottle cleaning liquid, a rotor, means mounting the rotor in the tank for rotation about an axis inclined at an angle of about 4–8° to the horizontal, a pair of parallel plates carried by the rotor perpendicular to said axis, each plate having a multiplicity of round holes therethrough, said holes of the lower plate being substantially smaller than said holes of the upper plate, and the axis of each of a multiplicity of said holes of the lower plate coinciding with the axis of a said hole of the upper plate.

3. A bottle washing machine comprising a tank containing bottle cleaning liquid, a rotor, means mounting the rotor in the tank partly immersed in the liquid for rotation about an axis inclined an angle of about 4–8° to the surface of the liquid, and means for mounting a plurality of bottles on their sides on the rotor with the bottles inclined an angle of about 4–8° to the surface of the liquid, open end down.

4. A bottle washing machine comprising a tank containing bottle cleaning liquid, a rotor, means mounting the rotor in the tank partly immersed in the liquid for rotation about an axis inclined an angle of about 4–8° to the surface of the liquid, a pair of parallel plates carried by the rotor perpendicular to said axis, each plate having a multiplicity of round holes therethrough, said holes of the lower plate being substantially smaller than said holes of the upper plate, and the axis of each of a multiplicity of said holes of the lower plate coinciding with the axis of a said hole of the upper plate.

References Cited in the file of this patent
UNITED STATES PATENTS

| | | |
|---|---|---|
| 381,638 | Palmer | Apr. 24, 1888 |
| 582,505 | Kersten | May 11, 1897 |
| 1,684,827 | Hippenmeyer | Sept. 18, 1928 |